June 20, 1967     T. L. LINDH ETAL     3,325,961
METHOD AND A DEVICE FOR MANUFACTURING FILLED
AND SEALED PACKAGES
Filed Jan. 14, 1964     3 Sheets-Sheet 2

INVENTORS
Thorsten Lennartson Lindh
Harald Georg Swede
Lars Malte Roland Wettlén
Sven Olof Sören Stark
BY *Pierce, Scheffler & Parker*
ATTORNEYS INVENTORS
Thorsten Lennartson Lindh
Harald Georg Swede
Lars Malte Roland Wettlén
Sven Olof Sören Stark
BY Pierce, Scheffler & Parker
ATTORNEYS

United States Patent Office 3,325,961
Patented June 20, 1967

3,325,961
METHOD AND A DEVICE FOR MANUFACTURING FILLED AND SEALED PACKAGES
Thorsten Lennartson Lindh, Lund, Harald Georg Swede, Malmo, Lars Malte Roland Wettlen, Lomma, and Sven Olof Sören Stark, Lund, Sweden, assignors to AB Tetra Pak, Lund, Sweden, a company of Sweden
Filed Jan. 14, 1964, Ser. No. 337,660
Claims priority, application Sweden, Jan. 16, 1963, 442/63
3 Claims. (Cl. 53—28)

The present invention relates to a method of manufacturing filled and sealed packages comprising the step of flattening and sealing a tube consisting of relatively rigid but flexible packaging material in relatively narrow zones which are transverse to the tube axis and located at a distance from each other along the said axis, whereby the said tube is divided up into sealed units containing a quantity of filling material dispensed through the interior of the tube prior to the sealing of the unit and which are divided off from the tube by means of transverse cuts in the transverse sealing zones.

Manufacturing methods of this kind are nowadays used in practice in a great number of different packaging machines. In most of these the tube is made in step with the packaging operation proper from a web of packaging material which is given tube shape and is joined along its longitudinal edges into a longitudinal seam. The material of the web may in that case be one- or two-ply plastic coated paper, but other laminates having for instance metal foil layers, as well as one-ply webs of e.g. plastic alone, may be used. Some of the packaging machines in question produce a tube without any longitudinal seam by extruding plastic through an annular nozzle. It has even been suggested to use packaging machines for putting this method into effect, in which a tube having longitudinal seams is made from a web. In the interior of the tube there is extruded a tube without longitudinal seams, and this tube may possibly be caused to adhere to the exterior tube along its whole inner surface.

Irrespectively of the nature of the tube in the respect just mentioned, the packages manufactured by means of these earlier packaging machines have had their portion which is located between the transverse seals sealing the two respective package ends shaped to a form which is determined exclusively by the relative direction of the transverse seals, the properties of the packaging materials and the relative interior pressure of the enclosed and sealed unit.

When the two transverse seals of the package were in one and the same plane, the said portion of the package was shaped like a cushion with softly rounded surfaces except along the limits which are common to the transverse seals. When the transverse seals were in angularly opposed planes the said portion of the packages was of tetrahedral shape having softly rounded transitions between adjacent tetrahedral sides except along the limits which are common to the transverse seals.

In particular with respect to the cushion-shaped packages but to a certain extent also with respect to the packages having tetrahedral shape, the quantity of filling material affected the shape of the package decisively.

That the properties of the packaging material will also affect the shape of the package should be evident without further. Cushion-shaped packages which are identical in other respects are "thinner" if made from rigid packaging material than if made from less rigid material. The fact is the same with respect to tetahedral packages, where a less rigid material will produce a rounder and more bulging shape than a more rigid material will. If the packaging material were not rigid at all, the angularly opposed transverse seals would hardly produce a strict tetrahedral shape.

As the two main types of package shapes mentioned above do not always satisfy the need for packages which are rational from the viewpoint of distribution and handling, it has been suggested, when transverse seals are located in the same plane and when a tube encloses a column of liquid filling material which is divided off together with the tube at each transverse sealing operation, that the packages should be given an end surface, which is transversal and generally perpendicular to the tube axis, by axial upsetting at each end. In order to produce an angular cross section of the package the tube had to be provided with a crease line pattern corresponding to the package edges, running between the said end surfaces.

Upsetting the end of the package being sealed will of necessity produce radially outwardly directed stresses on the package wall, said stresses being propagated hydraulically through the volume of filling material. If these stresses are to be maintained within such limits, without the necessary support pressure along the corresponding edges of the tube side, that the packaging material or the seals will not burst, the end upsetting will not be very effective and will not give a permanent shape to the final package.

The preliminary creasing of the packaging material does not affect this situation, as the radially outwardly directed stresses on the package wall strive to give a rounded shape to the said wall instead of the angular shape aimed at by means of the crease lines. From a purely practical viewpoint a crease line pattern made in advance will make the packaging operation proper more difficult, as it is a difficult technical problem already with respect to tubes without longitudinal seams and with respect to tubes having a longitudinal seam parallel to the tube axis, to control the tube with the necessary precision in the circumferential direction so that the lines of the crease line pattern will be located where intended on the package wall. The difficulties with respect to the fit are still more evident if the tube is helically wound from a web and thus obtains a helical longitudinal seam.

The present invention aims at removing the above difficulties, and for this purpose it points out a method whose main characteristic is that with respect to each of the said units the corresponding tube length with its interior support is caused, by means of cooperating exterior forming surfaces having, together, an active area which essentially coincides with the outside area of at least that portion of the tube length which is located between the two transverse sealing zones, to have its recently mentioned portion lie closely in essentially all points along its outer side against one of the forming surfaces, without any essential plastic dimensional change of the tube wall material taking place in any sense, and thus to be deformed to a permanent shape determined by the structure, shape and relative extension of the said surfaces in the active final deforming position, and deviating from the shape which is conditioned only by the relative directional relation of the transverse seals, the properties of the tube wall material, and the relative interior pressure of the sealed unit, the internal support partly consisting, at any rate during the initial stage of the deforming operation, of a fluid, i.e. a gaseous and/or a liquid medium having a static and/or dynamic counterpressure effect while consisting, at least partly and at any rate during the final stage of the deforming operation, of the filling material.

Two fundamentally different filling methods may be used with respect to liquid filling material. According to one of them, the tube encloses a column of filling material which fills its inner cross-sectional area completely and which is divided off simultaneously with the tube so as to form a sealed unit. According to this method, the deformation of the tube length to the intended permanent shape takes place according to the invention with the filling material alone as interior support. According to the other filling method, the filling material is dispensed to the tube in such a way that the filling material will not fill the unit in question completely until possibly at the transverse sealing operation. In that case the invention proceeds on the assumption that the deformation of the corresponding tube length to the intended permanent shape will at least start with gas as part of the interior support. In the final stage of the deforming operation the required interior support may consist either of the filling material alone or of the filling material and gas.

If the filling material consists of solid pieces, granules or powder, the deformation of the tube length to the intended permanent shape according to the invention may start with fluid alone as the necessary interior support. Preferably, the fluid in question is a gas, although it may be either a liquid or both a liquid and a gas.

With regard to the time, the deformation of the tube length in question to the intended permanent shape may start either before or after the sealing operation. In the former case the deformation may be performed either at or after the sealing. If the deformation starts after the sealing, it must of course also finish after the sealing.

Due to the fact that at least part of the interior support, at any rate in the initial stage of the deforming operation, is a fluid, i.e. a gaseous and/or a liquid medium according to international definitions, its property of propagating the reaction produced by the external deforming pressure to each point of the inside of the enclosing tube wall may be utilized to its optimum for the purpose of making the deformation in question possible and even easier. In addition to propagating a dynamic counterpressure the fluid acting as a support may, of course, produce a static counterpressure. In the embodiments of the method according to the invention in which the deforming operation is started for the purpose of sealing the unit in question, this static counterpressure allows itself to be adapted and varied in a simple way. If gas is at least used as a support, the static counterpressure effect of the support is changed by varying the pressure of the gas acting as a support. If the filling material is in the shape of a column filling the internal cross-sectional area of the tube completely, said column being divided off simultaneously with the tube at the transverse sealing of the tube length in question, the static supporting pressure may be controlled by varying the height of the column of filling material or by varying the pressure acting on the free surface of the column of filling material.

If the deformation implies an axial upsetting of the tube length at one end thereof in order to form an end surface transversal to the tube axis, a triangular, double-walled flap will be formed at each end of the corresponding transverse sealing fin, said flap projecting from the defining edge of said end surface either outside the rest of the unit or into it. In the latter case it is assumed that the transverse sealing of the tube is preceded by folding it like a bellows.

Apart from the said triangular flaps, a deformation which includes an end upsetting of the above mentioned kind may result in a great many shapes, all of which have at least one transverse end surface with a sharp, transverse defining edge. The unit may lack sharp defining edges running essentially in an axial sense between adjacent wall portions, but it may also have such lines. In the former case the transverse end surface will thus merge with a softly rounded wall portion, while in the latter case it will merge with an angular wall portion.

When the two ends of the tube lengths are both upset, the result is, in the former case, an essentially cylindrical unit having two sealing fins and four possibly projecting triangular flaps, while in the latter case a multitude of shapes may be obtained. Among these units of angular shape, which of course also have two sealing flaps and four possibly projecting triangular fins, the parallelepipedic shape is no doubt used to the greatest extent.

The units which have been deformed and sealed to the intended permanent shape may contain either the filling material alone or the filling material and a separate supporting fluid. If the filling material is a liquid, the separate supporting fluid may, in the latter case, only be a gas, while the separate supporting fluid may be a gas, a liquid or both.

The invention will be described in greater detail below with reference to the accompanying drawings, showing the invention as applied to the manufacture of parallelepipedic packages.

Figure 1:
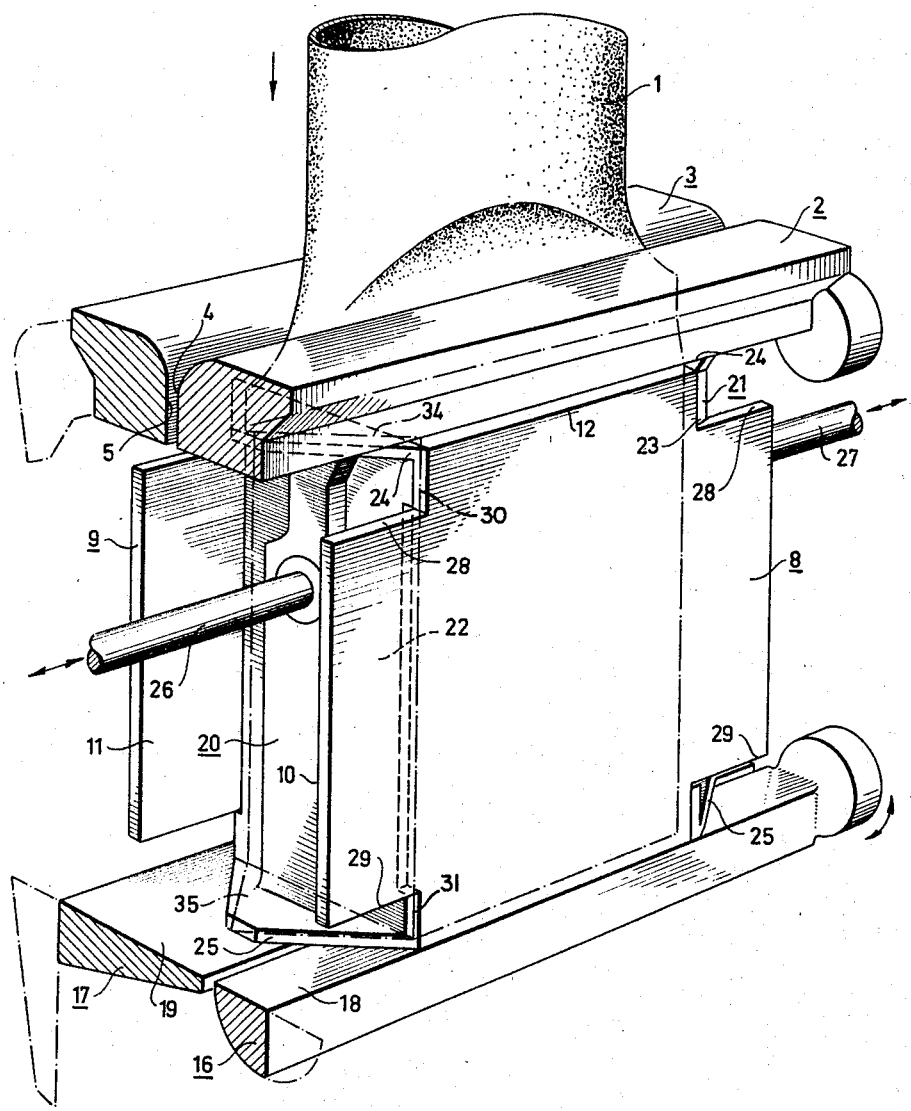
FIG. 1 is a diagrammatic perspective view of a package-shaping pressing means in a position of active final forming operation in a device for putting the method according to the invention into effect.

In FIG. 1 for purposes of better clarity only the package-shaping part proper of a packaging machine is shown. It is assumed that the machine in question is of the known type which manufactures a downwardly directed—in this case vertical—tube 1 having a relatively rigid but flexible wall. Accordingly as it is being made, the tube 1 is fed downward between two stationary cooperating sealing jaws 2 and 3. The tube 1 has a heat-sealable inside, and the jaws 2 and 3 are adapted to press the tube 1 flat in relatively narrow zones transversal to the tube axis and located at a distance from each other along said axis and, in so doing, to supply heat to the inside of these zones, whereby the tube 1 is divided off into sealed units.

From the upper end of the tube 1 liquid filling material is introduced into its interior in such a way that at each transverse sealing operation the level of the filling material is above the said transverse sealing zone. The transverse sealing of the tube 1 thus entails a simultaneous dividing off of a column of filling material in the tube 1. This in turn implies that the sealed units into which the tube 1 is divided off are completely filled with the filling material.

The filled and sealed units are divided off from the tube 1 by means of transverse cuts in the transverse sealing zones.

While the known part of the packaging machine which has been described until now only uses a stationary pair of cooperating transverse sealing jaws as package-shaping means proper, the machine in the embodiment shown diagrammatically in FIG. 1 comprises a package-shaping device, of which the pair of stationary transverse sealing jaws 2 and 3 are only a part.

The squeezing jaws 2 and 3 are shaped as two flaps which are pivotable about each one of two parallel horizontal axes, located on both sides of the vertical tube feeding path, into a position shown in FIG. 1, in which their two cooperating squeezing surfaces 4 and 5, respectively, occupy their active transverse sealing position essentially in a plane axial to the tube 1, while facing downward with two essentially plane surfaces 6 and 7, respectively, which in this position are essentially contained in one and the same horizontal plane.

Below this horizontal plane there are two stationary plates 8 and 9 on both sides of the vertical tube feeding path. These plates face each other with two essentially plane, vertical and relatively parallel surfaces 10 and 11, respectively. The plates 8 and 9 have horizontal edges 12 and 13, respectively, at the top, which are essentially contained in the above mentioned horizontal plane.

At the bottom the plates 8 and 9 have edges 14 and 15, respectively, which are also horizontal. Said edges are essentially contained in a horizontal plane. Two lower stationary flaps 16 and 17 are pivotable about each one of two parallel horizontal axes, located at each side of the vertical tube feeding path, into a position in which they face upward with two essentially plane surfaces 18 and 19, respectively, which in this position are essentially contained in the horizontal planes of the lower plate edges 14 and 15, respectively. In this position the upwardly-facing surface 19 of one flap extends past the axial plane which is parallel to the pivot axes of the flaps 16 and 17 up to the tube 1.

Between the surfaces 10 and 11, respectively, of the plates 8 and 9, said surfaces facing each other, there are pistons 20 and 21 horizontally displaceable towards and from each other from both sides of the vertical tube feeding path. These pistons face each other with each one vertical front surfaces 22 and 23 which is perpendicular to the plate surfaces 10 and 11, respectively. In addition, they face upwards with each one horizontal surface 24 (only one being shown) adjacent the front surfaces 22 and 23, respectively, and downwards with each one horizontal surface 25 (only one being shown) adjacent the front surfaces 22 and 23, respectively. The upper horizontal piston surfaces 24 are contained in essentially one and the same horizontal plane which is located somewhat below the horizontal plane of the upper plate edges 12 and 13, while the lower horizontal piston surfaces 25 are contained essentially in a common horizontal plane, which is located somewhat above the horizontal plane of the lower plate edges 14 and 15.

The displacing motion is propagated to the pistons 20 and 21 by means of horizontal piston rods 26 and 27, respectively.

Along their upper edges 12 and 13 the plates 8 and 9 have upper corner receses 28, and along their lower edges 14 and 15, respectively, lower corner recesses 29. The said upper and lower corner recesses 28 and 29 are each defined by a horizontal edge and a vertical abutment edge. In the upper and lower corner recesses 28 and 29 there are received upper and lower lateral shoulders 30 and 31, respectively, of the pistons 20 and 21, which by abutting against the vertical abutment edges of the upper corner recesses 28 and 29 determine the inner position shown in FIG. 1 to which the pistons 20 and 21 are displaceable against each other.

Figure 2:
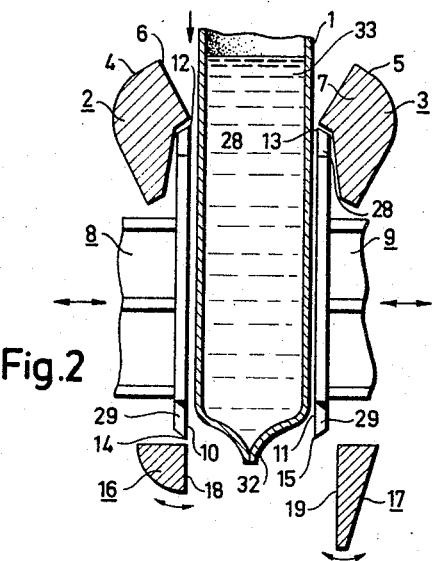
FIGS. 2 to 5 are diagrammatic and partly sectioned side views of the pressing device according to FIG. 1 at various stages of the packaging operation.
Figure 5:
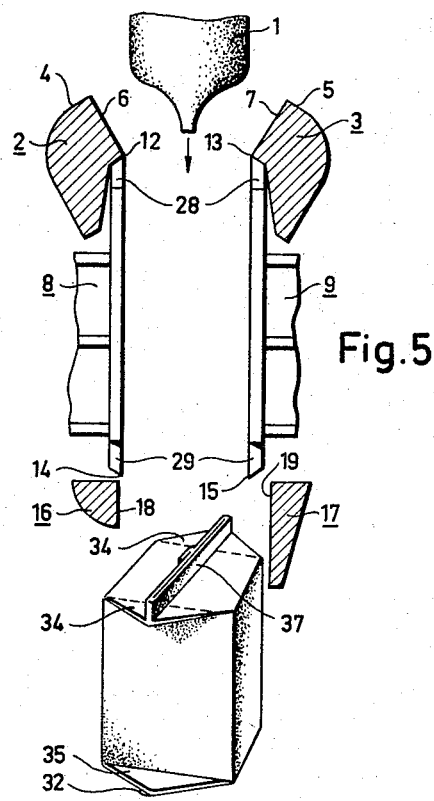

The upper flaps 2 and 3 are pivotable upwards and outwards about their pivot axes to their inactive positions shown in FIGS. 2 and 5, while the lower flaps 16 and 17 may be pivoted downward and outward about their pivot axes to their inactive positions shown in FIGS. 2 and 5.

FIGS. 2 to 5 show various phases of the package-shaping operation in the forming device according to FIG. 1. In FIG. 2 it is thus assumed that the flaps 2, 3, 16, and 17 are swung away to their inactive positions. It is also assumed that the pistons 20 and 21 are entirely moved apart to their outer turning positions (not shown). Between the stationary, fixed plates 8 and 9 the tube 1 has been fed downward so that it is located slightly below the lower edges 14 and 15 of the plates 8 and 9, respectively, with its end sealing fin 32 resulting from the immediately preceding package-shaping operation.

After the tube 1 has been fed downward between the plates 8 and 9, the pistons 20 and 21 are displaced towards each other to their innermost final position determined by the shoulders 30 and 31 and the recesses 28 and 29, respectively. In this position the front surfaces 22 and 23 of the pistons 20 and 21, respectively, define, together with the surfaces 10 and 11 of the plates 8 and 9, facing each other, a parallelepipedic cavity having a cross section whose circumference essentially coincides with the outer periphery of the cross section of the tube 1. The tube 1 encloses a column 33 consisting of liquid filling material, whose volume exceeds the volume of the said cavity, and therefore the tube wall strives, when the pistons 20 and 21 are pressed against it with the assistance of the hydraulic counterpressure produced in the volume of filling goods, to lie closely not only to the piston front surfaces 22 and 23 and the plate surfaces 10 and 11 but also to the upper and lower horizontal piston surfaces 24 and 25, respectively. Along each one of the latter there is formed a double-walled triangular lug 34 and 35, respectively, projecting from the tube 1 (cf. FIGS. 1 and 5).

Figure 3:
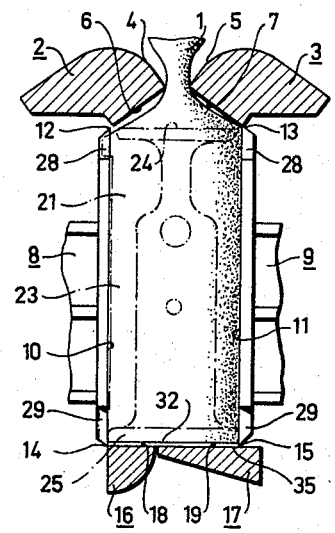

In more or less direct connection with the displacement of the pistons 20 and 21 to their active position the lower flaps 16 and 17 are swung to their active position, as shown in FIG. 3. In this position the flaps 16 and 17 form with their plane surfaces 18 and 19, respectively, a plane, essentially unbroken bottom wall in the above mentioned cavity and strive, using the column of filling material 33 as an interior support in the tube 1, to upset its lower end in order to form a plane and horizontal end surface. However, the flap surfaces 18 and 19 overlap also the corresponding lower horizontal piston surfaces 25 in such a way that the two respective double-walled triangular lugs 35 are pressed flat between these and the flap surfaces 18 and 19. Preferably, the distance between the plane containing the piston surfaces 25 and the plane in which the flap surfaces 18 and 19 are contained in their active position is such that the flattening of the lower lugs 35 entails that the quantity of filling material in these is essentially pressed away inwardly towards the rest of the interior of the tube 1.

As in the present case, the two lowermost flaps 16 and 17 are assumed to be pivotable about pivot axes which are parallel to the direction of the sealing fin 32 and since the active surfaces 19 of one flap 17 in its active position besides extends past the axial plane of the tube 1 which is parallel to the said pivot axes, the pivoting of the flap 17 inwardly and upwardly to its active position entails that the transverse sealing fin 32 is folded around its inner defining edge so as to abut against the package end surface formed against the flap surfaces 18 and 19 and the plane undersides of the lugs 35, which are also formed by the flap surfaces 18 and 19 merging with the said end surface.

Already during that phase of the shaping operation which is shown in FIG. 3 there begins the inward and downward swinging of the upper flaps 2 and 3, through which these are caused to occupy their active position. At this swinging motion the flaps 2 and 3 together with their forming surfaces 6 and 7, respectively, and together with the upper horizontal surfaces 24 of the pistons 20 and 21 perform, with respect to said upper lugs 34 and the adjacent tube wall portion, a flattening and upsetting operation corresponding to that produced by means of the horizontal piston surfaces 25 and the flap surfaces 18 and 19. The flap surfaces 6 and 7 are adapted for this purpose to overlap the piston surfaces 24 to a sufficient degree. At the same time the squeezing surfaces 4 and 5 of the flaps 2 and 3, respectively, flatten the tube 1 between them along a corresponding transversal zone in which the corresponding portions of the tube 1 are pressed against each other inside to inside, while the column of filling material is simultaneously divided off.

The flaps 2 and 3 are adapted to supply sealing heat to the plastic inside of the said opposite tube wall portions in the transverse zone, so that the tube 1 is effectively sealed in the transverse zone under the action of pressure and heat. The heat may be supplied from one or both squeezing surfaces 4 and 5 by heat conduction from the outside of the tube 1. For better clarity the heat supply means have been left out, as it is of no importance for putting this method into effect which known method of heat sealing is utilized.

Figure 4:
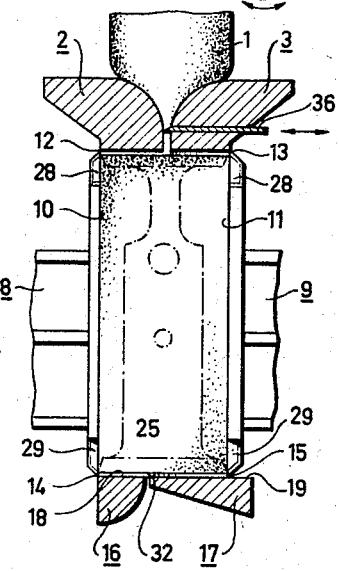

As the column of filling material 33 is fully divided off only at the active sealing position of the flaps 2 and 3 shown in FIG. 4, the interior of the tube portion which is located between the plates 8 and 9 and the pistons 20 and 21 communicates with the interior of the rest of the tube. Therefore, if a higher static interior counterpressure is desired in the volume of filling material in the enclosed tube portion, this may be realized by means of a taller column of filling material 33 in the tube 1 or by an auxiliary pressure applied to its free surface.

By means of suitable coordination of the flap and piston motions the dynamic pressure created also in the filling material may be used as interior support pressure during the deforming operation.

When the flaps 2 and 3 have been swung to their final position shown in FIG. 4, the forming operation has been completed. In this position the flap surfaces 6, 7, 18, and 19, the plate surfaces 10 and 11, and the piston front surfaces 22 and 23 define a parallelepipedic cavity from which the relevant tube portion projects only with flattened portions, viz the four lugs 34 and 35 and the upper sealing zone, while for the rest it rests against the inside of the cavity in every point thereof. The lugs 34 and 35 just mentioned rest in each point along their flat portions against the respective flap surfaces 6, 7, 18, and 19, and the respective piston surfaces 24 and 25, while the same applies to the upper transverse sealing zone with respect to the squeezing surfaces 4 and 5 of the flaps 2 and 3, respectively.

In FIG. 4 one of the two upper flaps, viz flap 3, is shown provided with tube cutting means comprising a knife 36 displaceable in the flap 3, said knife being adapted to be projected from the squeezing surface 5 of the flap 3 when the flaps 2 and 3 are in the sealing position and, using the squeezing surface 4 of the flap 2 as an abutment, cut the tube 1 in the sealing zone defined by the squeezing surfaces 4 and 5.

When the tube 1, after completing its forming operation, has been cut with the knife 36, the flaps 2, 3, 16, and 17 are swung aside, and the pistons 20 and 21 are returned to their respective inactive positions, as shown in FIG. 5. When this is done the completely filled and sealed unit separated from the tube 1 is ejected in a formed state from the forming means, whereupon said means is free to repeat the forming operation just described with respect to a new tube length which has been fed down between the plates 8 and 9 to the position shown in FIG. 2.

The unit ejected from the forming means is in this case of general parallelepipedic shape having two pairs of opposed and parallel side walls, which have been formed by the front surfaces 22 and 23 of the pistons 20 and 21, respectively, and by the surfaces 10 and 11 of the plates 8 and 9, respectively, said surfaces 10 and 11 facing each other. At each end the unit has a sealing fin 32 and 37, respectively, the lowermost fin 32 being bent about its inner defining line so as to rest against the corresponding plane end surface formed by the surfaces 18 and 19 of the flaps 16 and 17, respectively. The upper sealing fin projects at right angles from the corresponding upper end surface, which has been formed by the surfaces 6 and 7 of the upper flaps 2 and 3, respectively. In the same plane as the adjacent end surface of the unit the double-walled, flattened and triangular lugs 34 and 35, respectively, project from the unit.

In its ejected state the unit may constitute the finished package, but it may also be modified in appearance by a separate operation while retaining its parallelepipedic form. Thus, the upper sealing fin 37, like the lower one, may be bent about its inner defining line into contact with the adjacent end surface of the unit, and the four lugs 34 and 35 may then be bent about their inner defining lines into contact with either the adjacent side surface or the adjacent end surface, and be fixed in this bent position. Thereby a parallelepipedic package without sealing fins or lugs is obtained.

Even without any bending of the sealing fins 32 and 37 and the lugs 34 and 35, and the fixing of the latter against the package body proper, the form imparted to the sealed unit by the forming means is permanent in the sense that the unit will retain its form even after it has been ejected from the press forming means. An additional factor contributing to this is, of course, the relative rigidity of the packaging material but above all the abrupt transitions between adjacent panels in the unit. The permanent shape deviates with respect to the portion of the unit in question which is located between the inner defining lines of the sealing fins from the shape which would be assumed by the unit if the tube were only sealed transversely and were not subjected to any pressure deformation between successive transverse sealing operations.

In the present case the press forming means in its active position can be said to define a forming cavity with the portions of its forming surfaces 4, 5, 6, 7, 24, 10, 11, 22, 23, 25, 18, and 19 corresponding to the finished unit. In each point along the inside of said cavity the tube length in question is caused to rest, without any essential plastic dimensional change of the tube wall material taking place in any sense, with interior support from the enclosed volume of filling material, whereby the said material obtains the shape of the cavity. The supporting pressure of the volume of filling material may in that case consist essentially of the dynamic pressure of the column of filling material produced at the deformation of the tube length, or else it may consist essentially of its static pressure.

It would of course be possible to shape the lower flaps 16 and 17 of the press forming means in such a way that, like the upper flaps 2 and 3, they would receive the adjacent sealing fin 32 in a squeezing grip between them.

Within the scope of the invention it is further possible to begin by separating from the tube 1 completely filled and sealed units which have a shape essentially conditioned by the transverse seals and then to deform these units to the intended permanent shape by a separate press forming means. For this purpose it would be possible to use a press forming means of the two types described above where either one or both sealing fins would be received in a squeezing grip between cooperating end flaps. However, when press forming sealed and separated units, it may be advisable to shape both pairs of flaps like the pair of flaps 16, 17 so that at the press forming both sealing fins are bent about their inner defining lines into contact with the adjacent end surface of the unit being formed.

It is evident that when press forming a unit originally sealed it is chiefly the dynamic counterpressure in the enclosed volume of filling material produced at the deformation that contributes to the desired pressing of the tube length against the active inside of the forming cavity.

Although it has been assumed in the present connection that the unit shall be given a permanent form in which projecting triangular, double-walled lugs are formed adjacent the ends of the two sealing fins of the unit, it is of course possible to visualize forms in which such lugs do not occur at all or where there merely occurs one lug at each end of a sealing fin or one lug at one end of one sealing fin. In all these cases the demand for a permanent shape remains, and this is realized by means of abrupt transitions between adjacent wall panels. One example of a shape in which there are no lugs of the kind mentioned just now is the tetrahedral shape, which besides requires sealing fins which are angularly displaced in relation to each other.

The present specification has proceeded so far on the assumption that the tube encloses a column of filling material which fills its inner cross-sectional area completely, said filling material being a liquid and said column being divided off simultaneously with the tube at the transverse sealing thereof. The interior support necessary for the deformation of the tube length corresponding to a sealed unit thus consists exclusively of the filling material.

Within the scope of the invention it is possible, however, to feed the filling material to the interior of the tube in such a way that the tube length in question during at least part of the deforming operation does not have its interior cavity completely filled with filling material, or even lacks filling material completely. The filling material may in that case consist of a liquid, but filling material of solid pieces, granules or powder may also occur. In the former case it is necessary, at least at the initial stage of the deforming operation, that the interior cavity of the tube length which is not filled with filling material is instead filled with a gas under a suitable static pressure. This gas alone or together with the filling material has to act as the necessary support. Depending on whether the filling material at the sealing of the unit in question fills its interior cavity or not, the unit in a sealed state contains a supporting gas in addition to the filling material, or lacks such a gas, respectively. If the filling material is solid, the case is the same, except that the supporting fluid may be a gas, a liquid or both.

With reference to FIGS. 6 to 10, the process according to the invention will be described with respect to a press forming means which, as distinct from the press forming means described so far, is meant to operate with continuous tube feeding in a downward direction.

The continuously operating press forming means in the present packaging machine is meant to replace the intermittently operating press forming means according to FIGS. 1 to 5 and comprises two or more pairs of co-operating transverse sealing jaws 38 and 39.

These jaws 38 and 39 in each pair are adapted to flatten and heat-seal the tube 1 from both sides of the tube between cooperating squeezing surfaces 40 and 41, respectively, along relatively narrow zones perpendicular to the tube axis in the axial plane of the tube 1 which is common to all the pairs of jaws. The pairs of jaws 38 and 39 are brought successively into an active flattening engagement with the tube 1 at a certain upper level along the vertical tube feeding path, and release the grip again at a lower level which is located at a distance below the upper level which corresponds to at least the distance between two successive sealing zones. After releasing the tube 1 the pairs of jaws 38 and 39 are once more brought successively into engagement with the tube at the upper level. Thus, the pairs of jaws 38 and 39 perform, in the gripping position, a translation motion in the tube feeding direction, i.e. downward, while during the return to the upper level they perform a translation action in the opposite direction, i.e. upward.

With regard to shape and dimensions the jaws 38 and 39 are alike, and each consists of an essentially plane horizontal plate having a plane edge surface constituting the squeezing surfaces 40 and 41, respectively. When the pair of jaws is in a closed position the top sides 42 and 43 of the jaws 38 and 39, respectively, are essentially contained in one and the same horizontal plane.

Opposed and relatively similar form wall elements 44 and 45 are hingedly connected with the jaws 38 and 39 in a manner not shown, said form wall elements facing each other with a cross-sectionally U-shaped inner wall and being adapted to be closed against each other around the tube 1 in the transverse sealing direction from both sides of the vertical tube feeding path, thus forming together with the inner walls a tubular forming cavity having four sides at right angles to each other in both longitudinal section and cross section. This forming cavity has its longitudinal axis parallel to the tube axis and is itself open at its two ends, i.e. at the top and at the bottom. The dividing plane of the forming cavity is essentially contained in the axial plane of the tube 1, which is parallel to the squeezing surfaces 40 and 41 in the transverse sealing position.

At the top and at the bottom the forming wall elements 44 and 45 have essentially plane end edges which are perpendicular to the inside wall. The shank portions of the wall elements 44 and 45 besides have top and bottom projecting flanges 46 and 47, respectively, having a plane top side and a plane underside, which are essentially contained in the same plane as the upper and the lower wall element edge, respectively. In their closed position the two cooperating forming wall elements 44 and 45 form at each end of the forming cavity together with their corresponding end edges and with the top sides and the undersides, respectively, of their flanges 46 and 47, respectively, an essential plane surface closed around the tube feeding path.

The wall elements 44 and 45 are adapted to rest along their lower end edge against the plane top sides 42 and 43, respectively, of the pertaining jaws 38 and 39, respectively, and also to overlap a corresponding portion of the top sides 42 and 43 of the jaws, respectively, with the underside of their lower flanges 47. They are further adapted to rest along their upper end edge against the plane underside 48' and 49', respectively, of the jaws 38' and 39', respectively, which is active on the same side of the tube feeding path in the subsequent pair of jaws, and to overlap a corresponding portion of the said jaw underside 48' and 49', respectively, with the top side of their upper flanges 46.

Figure 6:
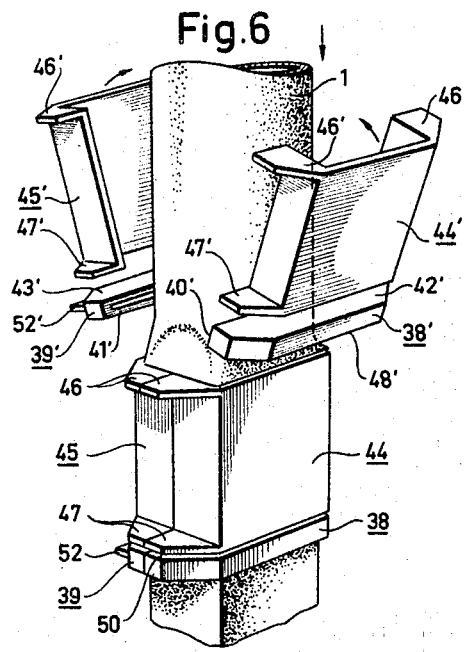
FIGS. 6 to 9 are diagrammatic perspective views of another embodiment of pressing means in various stages of the package-shaping operation.

In FIG. 6 the lower pairs of jaws 38 and 39 are assumed to have closed around the tube 1, sealing it transversely of a horizontal transverse sealing zone. In that position the jaws 38 and 39 have moved their respective forming wall elements 44 and 45 inward towards the tube 1. The forming wall elements 44 and 45 have then been pivoted against each other to their closed position about horizontal axes parallel to the squeezing surfaces 40 and 41 of the jaws 38 and 39. As the tubular forming cavity defining the two wall elements 44 and 45 in the plane perpendicular to the tube axis has an inner profile whose circumference essentially coincides with the outer periphery of the tube 1 in the same plane, the wall elements 44 and 45 at the enclosing of the tube 1 in this forming cavity have at least started a deformation of the corresponding tube length to the cross-sectional form of the cavity.

At this deformation the "excess" tube wall material adjacent the top sides of the jaws 38 and 39 forms, between the said jaws and the undersides of the adjacent wall element flanges 47, two triangular, double-walled flaps 50 having their base in the vertical plane containing the two adjacent shank wall insides of the wall elements 44 and 45 and having one corner at each one end of the sealing zone flattened between the squeezing surfaces 40 and 41 of the jaws. These flaps 50 are flattened between the respective flange 47 and the jaws 38 and 39 at the closing motion of the wall elements 44 and 45, an axial upsetting of the tube length in question against that portion of the top sides 42 and 43 of the jaws which is located within the cross section of the forming cavity being at least started. Of course, the top sides 42 and 43 of the jaws together cover this cross section and besides the undersides of the flaps 50 essentially completely, while the pairs of adjacent flanges 47 cover the top side of the corresponding flap 50 with their undersides.

Figure 7:
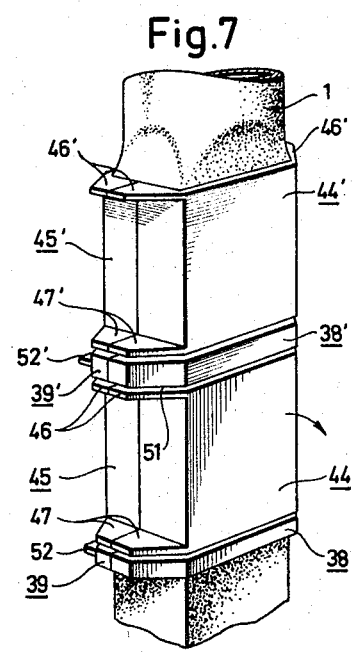

FIG. 7 shows that the subsequent pair of jaws 38', 39' has been closed around the tube 1 and has sealed it transversely by pressing it flat above the wall elements 44 and 45 which are closed against each other. In that connection each of the jaws 38' and 39' has been moved in a movement curving inward and downward into engagement with the tube wall so as to establish their first contact with the tube 1 a short distance above the upper end edges of the wall elements 44 and 45 and so as to rest against these with their undersides 48' and 49', respectively, in their fully closed position.

When the jaws 38' and 39' are in closed position, the jaw undersides 48' and 49', respectively, together cover essentially completely the cross section defined, when the forming cavity is in a closed position, by the wall elements 44 and 45, respectively, of the lower jaws 38 and 39, as well as the top sides of the upper flanges 46 of the said wall elements 44 and 45.

At the closing motion of the top jaws 38' and 39' the tube length enclosed in the forming cavity formed by the lower wall elements 44 and 45 has been axially upset against the jaw undersides 48' and 49', whereby two triangular, double-walled flaps 51, similar to the flaps 50 described previously, have been formed and flattened between the said undersides and the top sides of the flanges 46. When they are in their active position, the jaw undersides 48' and 49' cover the top sides of the flaps completely, just like the pairs of adjacent flanges 46 of the wall elements 44 and 45 of the lower jaws 38 and 39, respectively, each cover the top side of the corresponding flap 51 with their top sides.

Like in the intermittently operating embodiment it is assumed that the tube 1 in the present case encloses a column of filling material in the nature of a liquid, said column having such a length that at each transverse sealing of the tube 1 it is divided off at the transverse sealing point. The result of this is that the filling material in this case, too, will act as a hydraulic interior support when the tube is deformed in the forming cavity, said support making the intended deforming operation possible. In that connection the static pressure produced in the column of filling material by the column of such material which is above the transverse sealing level may contribute actively to the deformation, as long as the top pair of jaws 38', 39' have not yet flattened the tube 1 completely.

When the lower jaws 38 and 39, their wall elements 44 and 45, and the top squeezing jaws 38' and 39' are in the position shown in FIG. 7, the tube length in question is caused to lie closely to the inside of the forming cavity defined by the wall elements 44 and 45 in every point along said inside, and besides to lie flat against the top sides 42 and 43 of the lower jaws 38 and 39, respectively, the undersides of the lower wall element flanges 47, the undersides 48' and 49' of the top squeezing jaws 38' and 39', the top sides of the upper wall element flanges, and the squeezing surfaces 40, 40', 41 and 41' of the two pairs of jaws 38, 39 and 38', 39', respectively. The result of this is that the tube length is given a parallelepipedic shape having two fins projecting at right angles in a central plane of symmetry, one fin along each end surface, said fins each extending both along the end surface and along two triangular flaps 50 and 51, respectively, which project with one side in the plane of the end surface in opposite directions from the parallelepiped.

In connection with the closing movement of the top jaws 38' and 39', wall elements 44' and 45' which are hingedly supported by these jaws are moved together in the same way as the lower wall elements 44 and 45 previously, and start the deformation of the next tube length.

In each pair of jaws one jaw 39, 39' etc. has a knife, 52, 52', etc. which is adapted to project with an edge from the squeezing surface 41, 41', etc. of the jaw when the jaws are in closed position, in order to cut off a unit from the rest of the tube 1 located below the cut, by means of a transverse cut in the respective transverse sealing zone. In FIG. 7 it is assumed that the knife 52 of the lower pair of jaws 38, 39 has separated a previously finished unit from the tube 1 suspended from below the pair of jaws. However, this unit remains suspended from the pair of jaws 38, 39 as long as the jaws are closed.

Figure 8:
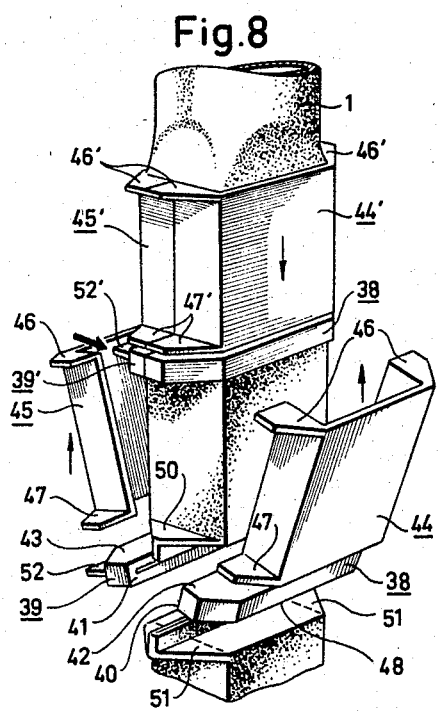

In the next phase of operation, which is shown in FIG. 8, the lower jaws 38 and 39, and consequently their wall elements 44 and 45, are moved apart out of the engagement with the tube 1. As a consequence hereof, the finished and separated unit which is suspended from below the jaws 38 and 39 is ejected.

Figure 9:
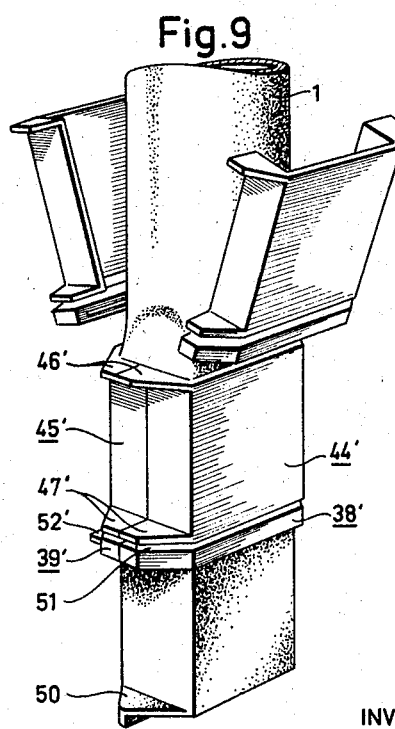

The next phase of operation, which is shown in FIG. 9, is a repetition of what has been shown in FIG. 7, except that the pair of jaws 38', 39', which were previously the upper pair, are now the lower pair, their wall elements 44' and 45', respectively, thus occupying the position of the wall elements 44 and 45. The previous lower pair of jaws 38, 39 and the wall elements 44 and 45 serve as the upper pair of jaws with their pertaining wall elements in case it is assumed that the packaging machine operates with only two sets of jaw pairs/wall element pairs, or a third pair of jaws with wall elements if the machine has more than two such sets. In the former case the previous lower pair of jaws 38, 39 has passed through its return path in the direction opposite to the tube feeding direction, while in the latter case it is about to start, or has started, its return movement.

When they are in their active sealing position the sealing jaws take part in the downward feeding movement of the tube 1, and hence they can perform this feeding movement. Because the deformation of the tube 1 to the intended shape actually implies a shortening of the tube length being deformed, the tube feeding movement is not even but implies temporary accelerations, which may be difficult to realize exclusively by means of the jaws without risk for slipping between the jaws and the outside of the tube wall. For this reason it may be advisable to let the packaging machine operate with separate tube feeding or with tube feeding produced both separately and by means of the jaws.

Above it has been indicated that the top and bottom end edges of the forming wall elements are essentially located in the same plane as the top side of the upper wall element flanges and the underside of the lower wall element flanges, respectively. In view of the thickness of the triangular flaps 50 and 51, which corresponds to the double tube wall thickness, each end edge of each wall element along the web portion of the wall element should project axially beyond the rest of the end edge to an extent corresponding to the tube wall thickness.

For the sake of better clarity the described embodiments of the press forming means for putting the process according to the invention into effect have only been described in a diagrammatic manner without mentioning the driving and controlling means generally occuring in packaging machines of this kind. It will be realized that those skilled in the present art are able, guided by the principles set forth above, to design packaging machines reproducing the method according to the present invention with modifications or equivalents of the press forming means described.

As the deformation of the filled tube in accordance with the invention is a press forming operation in a forming cavity which is closed with regard to its effect, said cavity giving to the corresponding tube length a form which is determined by the shape and structure of the inside of the forming cavity, the tube length being deformed may be provided with for instance "embossings" making the finished unit more rigid. For this purpose the corresponding portion or portions of the active forming surfaces of the press forming means are provided with embossed patterns.

Although it has been assumed when describing the embodiment according to FIGS. 6 to 9 that the filling material was liquid and alone constituted the requisite interior support, the person skilled in the art will realize that the continuous embodiment can be modified in such a way that the interior support will, during some phase of the deforming operation, at least partly consist of a fluid (in the sense used here) having a static and/or dynamic counterpressure effect, said fluid not consisting of the filling material. If the filling material is a liquid, the separate supporting fluid is a gas, while it may be a gas, a liquid or both, if the filling material is solid.

In the embodiment where the filling material alone is the interior support, the static counterpressure effect of the said material may, of course, be increased by applying extra pressure, either mechnically or pneumatically, to the free surface of the column of filling material.

To maintain in the tube a superpressure of gas, for one or the other of the purposes mentioned above, creates no insurmountable problems of a technical nature, whether according to the intermittent method or to the continuous embodiment. By suitable means the free passage in the direction opposite to the tube feeding direction may be obstructed, whereby gas under pressure having the intended counterpressure effect can be introduced into the portion of the tube which is thus efficiently sealed.

By suitable modifiactions of the pressing means described in FIGS. 6 to 9 filled and sealed units having another permanent shape, e.g. an angular tetrahedral shape, instead of essentially parallelepipedic packages, may be produced.

We claim:

1. Method of producing filled and sealed substantially parallelepipedic packages having sharp edges and corners which comprises forming a downwardly extending tube having a longitudinal joint from a plane, longitudinally uncreased, laminate web of relatively rigid and unstretchable packaging material, flattening and sealing said tube in a relatively narrow first zone transverse to the longitudinal axis thereof, disposing the lower end portion of said tube in the paralleledipedic space between four plane, rectangular, vertically disposed forming surfaces positioned at right angles to each other with said first zone extending below the lower edges of said four forming surfaces and supplying a fluent filling material to said tube in quantity sufficient to fill it from said first zone to a level above the upper edges of said four forming surfaces, closing the lower end of said space by upward movement of a first, plane, horizontally disposed forming surface, flattening and sealing said tube in a relatively narrow second zone below the level of fluent filling material therein but above the level of the upper edges of said four forming surfaces, closing the upper end of said space by downward movement of a second plane, horizontally disposed forming surface, volume of the space enclosed by all of said forming surfaces being substantially equal to the volume of that portion of said tube filled with filling material between said first and second zones, severing said tube within said second zone, withdrawing said first and second horizontally disposed forming surfaces from the upper and lower ends of said space, removing the resulting package from said space and repeaing the defined sequence of operations with another portion of said tube.

2. A method of producing filled and sealed substantially parallelepipedic packages having sharp edges and corners which comprises forming a downwardly extending tube having a longitudinal joint from a plane, longitudinally uncreased, laminate web of relatively rigid and unstretchable packaging material, flattening and sealing said tube in a relatively narrow first zone transverse to the longitudinal axis thereof, supplying filling material to the lower end portion of said tube and disposing said lower end portion of said tube in a forming mould constituted by a plurality of cooperating forming surfaces which are arranged to be movable inwardly against said lower end portion of said tube thereby forming said portion of the tube into a parallelepipedic shape corresponding to the shape of the closed forming mould, said forming operation being divided into two steps, namely (a) a first forming step during which the upper end of said portion of the tube which is disposed in the forming mould is open and during which step the forming surfaces are brought to a position in which the forming mould is not completely closed but is closed to such a degree that the lower end portion of said tube is given an aproximately parallelepipedic shape, (b) a second forming step during which the upper end of said portion of the tube is sealed in a relatively narrow second zone below the level of the fluent filling material but above the upper level of said forming surfaces, whereafter the forming surfaces are moved to their final position in which the forming mould is completely closed thereby increasing the pressure in the sealed part of the tube, whereby the packaging material is pressed against the inside of the forming mould, the volume of the forming mould constituted by said forming surfaces being substantially equal to the volume of that portion of said tube filled with filling material between said first and second zones, severing said tube within said second zone, opening said forming mould, removing the resulting package from said forming mould and repeating the defined squence of operations with another portion of said tube.

3. Process as defined in claim 1 in which the two ends of each unit adjacent said zones are folded inwardly forming a plane end surface having laterally extending double walled flaps.

References Cited

UNITED STATES PATENTS

| 2,113,636 | 4/1938 | Vogt | 53—28 X |
| 2,928,216 | 3/1960 | Orsini | 53—180 X |
| 2,982,066 | 5/1961 | Thompson | 53—180 |

FOREIGN PATENTS

| 149,954 | 2/1953 | Australia. |

TRAVIS S. McGEHEE, *Primary Examiner.*

FRANK E. BAILEY, *Examiner.*

P. H. POHL, *Assistant Examiner.*